US011067438B2

(12) United States Patent
Tsunekane

(10) Patent No.: US 11,067,438 B2
(45) Date of Patent: Jul. 20, 2021

(54) LASER BEAM PROFILE MEASUREMENT DEVICE

(71) Applicant: Canare Electric Co., Ltd., Nisshin (JP)

(72) Inventor: Masaki Tsunekane, Nagakute (JP)

(73) Assignee: CANARE ELECTRIC CO., LTD., Nisshin (JP)

( * ) Notice: Subject to any disclaimer, the term of this patent is extended or adjusted under 35 U.S.C. 154(b) by 0 days.

(21) Appl. No.: 16/633,729

(22) PCT Filed: Jul. 27, 2017

(86) PCT No.: PCT/JP2017/027309
§ 371 (c)(1),
(2) Date: Jan. 24, 2020

(87) PCT Pub. No.: WO2019/021435
PCT Pub. Date: Jan. 31, 2019

(65) Prior Publication Data
US 2020/0209058 A1    Jul. 2, 2020

(51) Int. Cl.
*G01J 1/42* (2006.01)
*G01J 1/04* (2006.01)

(52) U.S. Cl.
CPC ........... *G01J 1/4257* (2013.01); *G01J 1/0407* (2013.01); *G01J 1/0488* (2013.01)

(58) Field of Classification Search
CPC .......... G01J 1/4257; G01J 1/42; G01J 1/0407; G01J 1/0477; G01J 1/0488; G01J 1/0492; H01S 3/0014
See application file for complete search history.

(56) References Cited

U.S. PATENT DOCUMENTS 3,659,102 A * 4/1972 Toriyama ............... G01J 1/4257
250/458.1
4,916,319 A * 4/1990 Telfair ................... G01J 1/4257
250/365
(Continued)

FOREIGN PATENT DOCUMENTS

JP         S62137526 A    6/1987
JP         2002270926 A    9/2002
(Continued)

OTHER PUBLICATIONS

International Preliminary Report on Patentability for related PCT App No. PCT/JP2017/027309 dated Feb. 6, 2020, 8 pgs.
(Continued)

*Primary Examiner* — John R Lee
(74) *Attorney, Agent, or Firm* — Procopio, Cory, Hargreaves & Savitch LLP

(57) ABSTRACT

A laser beam profile measurement device includes: a plate-like or block-like fluorescence generation element including an incidence surface on which a laser light is incident and an emission surface from which the laser light is emitted; a light separation element for separating fluorescence from the laser light, the fluorescence generated in the fluorescence generation element and emitted from the emission surface; and an image element for receiving the fluorescence. The fluorescence generation element includes a first film formed on the incidence surface thereof. The first film has a wavelength-to-reflectance characteristic of transmitting a wavelength λ1 of the laser light and reflecting a wavelength λ2 of the fluorescence. The first film has a wavelength-to-reflectance characteristic of transmitting a wavelength λ1 of the laser light and reflecting a wavelength λ2 of the fluorescence. The light separation element may include a second film having a wavelength-to-reflectance characteristic of transmitting the wavelength λ2 and reflecting the wavelength λ1 or a third (Continued)

film having a wavelength-to-reflectance characteristic of reflecting the wavelength $\lambda 2$ and transmitting the wavelength $\lambda 1$. The first film may further have a wavelength-to-reflectance characteristic of reflecting a wavelength $\lambda 0$ between the wavelength $\lambda 1$ and the wavelength $\lambda 2$, while the second film may further have a wavelength-to-reflectance characteristic of reflecting the wavelength $\lambda 0$. Alternatively, the first film may further have the wavelength-to-reflectance characteristic of reflecting the wavelength $\lambda 0$ between the wavelength $\lambda 1$ and the wavelength $\lambda 2$, while the third film may further have a wavelength-to-reflectance characteristic of transmitting the wavelength $\lambda 0$.

7 Claims, 10 Drawing Sheets

(56) References Cited

U.S. PATENT DOCUMENTS

| | | | |
|---|---|---|---|
| 7,001,375 B2* | 2/2006 | Yee | A61F 9/00814 128/898 |
| 2002/0126724 A1* | 9/2002 | Tsunekane | H01S 3/1312 372/69 |
| 2003/0109787 A1* | 6/2003 | Black | A61B 5/0071 600/473 |
| 2004/0125361 A1* | 7/2004 | Riza | G01J 1/4257 356/121 |
| 2009/0015830 A1* | 1/2009 | Thomas | G01J 1/58 356/318 |
| 2016/0022492 A1* | 1/2016 | Berezhnyy | A61F 9/00804 606/5 |
| 2016/0025555 A1* | 1/2016 | Berezhnyy | A61F 9/008 356/122 |
| 2016/0065922 A1* | 3/2016 | Kadowaki | G03B 21/204 353/85 |
| 2020/0209058 A1* | 7/2020 | Tsunekane | G01J 1/0414 |

FOREIGN PATENT DOCUMENTS

| | | |
|---|---|---|
| JP | 2004245778 A | 9/2004 |
| JP | 2005504437 A | 2/2005 |
| JP | 2008519263 A | 6/2008 |
| WO | 2014208111 A1 | 12/2014 |

OTHER PUBLICATIONS

Decision to Grant for related JP App No. 2017-557026 dated Feb. 19, 2019, 6 pgs.
Tsunekane, M., et al., Measurement Method of High-accuracy 2D Beam Profile, A35th Annual Conference of Laser Society, Jan. 11-12, 2015, Japan, 4 pgs.
International Search Report for related PCT App No. PCT/JP2017/027309 dated Oct. 17, 2017, 6 pgs.

* cited by examiner

CONVENTIONAL EXAMPLE

LASER BEAM PROFILE MEASUREMENT DEVICE

CROSS-REFERENCE TO RELATED APPLICATIONS

This application is a U.S. National Stage entry of PCT Application No: PCT/JP2017/027309 filed on Jul. 27, 2017, the contents of which are incorporated herein by reference.

TECHNICAL FIELD

The present invention relates to a laser beam profile measurement device. More particularly, the invention relates to a laser beam profile measurement device adapted to measure a two-dimensional beam profile of high-power laser light with high positional precision and high accuracies.

BACKGROUND ART

The following methods are known as a conventional method for measurement of beam profile (two-dimensional light intensity distribution) of high-power laser light over 100 mW. The methods include: a method where the laser light is dimmed by means of a filter or mirror and observed with an image sensor such as CCD, and CMOS; a method where the intensity of transmitted light is measured while partly shielding the light beam with a pinhole, slit or knife-edge, and the beam profile is calculated from a correlation between the light shielding position and the intensity of transmitted light; a method where light intensity distribution is measured by two-dimensionally scanning with a rod with a small mirror at the tip thereof or a light guide rod foiled with a small hole at the tip thereof in the beam; and a method where a light scattering plate is irradiated with the laser light and an image of the scattered light is measured from behind by means of a camera. It is noted that the term "camera" used herein generally means devices for shooting images. The camera generally contains therein an image element (e.g., an image sensor such as CCD or CMOS) for detecting an image and an optical system (lens and the like) for forming an image on the image element.

The method of dimming the laser light with the filter or mirror requires some space for inserting the filter or mirror in front of the image sensor. However, some position of the beam to be measured prevents the insertion of the filter or mirror. In addition, the insertion of the filter or mirror involves fear that the beam profile may be deformed by heat or aberrations. On the other hand, the following problem is encountered by the method of taking measurement of the laser beam while partially shielding the beam with the pinhole, slit, or knife-edge. In a case where the beam profile is not single peaked but is complicated, the measurement accuracy may be significantly lowered due to the volume of information acquired by the measurement. The method of performing two-dimensional scanning in the laser beam by means of the rod with the small mirror at the tip or the light guide rod famed with the small hole at the tip thereof suffers the following drawback. The profile of a fine beam 1 mm or less in size cannot be measured because of the size of the mirror attached to the tip of the rod or the size of the hole at the tip of the rod. When mechanically scanning with the rod at high speed, the tip of the rod wavers and hence, the positional accuracy may also be lowered. According to the method where the light scattering plate is irradiated with the laser light so that the image of scattered light is measured with the camera from behind, the scattered light to be measured is scattered plural times and hence, the image is blurred. Particularly, in a case where the laser beam size is reduced to 1 mm or less, the measurement accuracy may be sharply lowered.

On the other hand, there is also known a method where the laser light is applied to a plate-like fluorescent body (fluorescent plate) and measurement is taken on a two-dimensional intensity distribution of the fluorescence emitted therefrom (see, for example, Patent Literatures 1 to 3, and Non-Patent Literature 1). The Patent Literatures 1 and 2 propose a method where the fluorescent plate is irradiated with the laser light from the front of the fluorescent plate and the fluorescence from the irradiated area is observed with a camera from a front side of the laser-irradiated fluorescent plate or from a back side thereof. The Patent Literatures 3 and the Non-Patent Literature 1 propose a method of using Nd:YAG as the fluorescent plate and report the experimental results. The Non-Patent Literature 1 is the report on the results of past experiments, a co-author of which is the inventor.

Now referring to FIG. 10, description is made on a heretofore proposed beam profile measurement method using the fluorescence. A laser light to be measured (wavelength: 808 nm) 1103 is applied to a film-like fluorescent body 1101 formed on one surface of a transparent block 1100. A laser light not absorbed by the fluorescent body 1101 penetrates through an interface 1102 to be emitted to the outside. On the other hand, fluorescence 1104 generated from the fluorescent body is reflected by the interface 1102 and removed of wavelengths other than fluorescence wavelength by a filter 1105. Then, the resultant light enters the camera 1106 to be focused into an image. The Non-Patent Literature 1 also discloses basically the same configuration except that transmission direction and reflection direction of the laser light are opposite. The literature cites Nd:YAG as an example of the fluorescent body.

Of the above-described prior-art techniques, the advantages of the measurement method using the fluorescence over the other measurement methods are described as below. First, the method enables an exact and high-accuracy identification of a position in an optical axis direction (z-axis direction) of the laser light to be measured on the fluorescent plate. Specifically, by placing the fluorescent plate at a position where the beam is to be measured, a beam profile at the place of interest is faithfully converted to a fluorescence intensity profile (fluorescent image), which is imaged by a camera for observation and storage. The fluorescence emitted from the fluorescent plate has a wavelength separated from that of the laser light so as to be easily separated from the laser light by means of a dichroic mirror (wavelength separation mirror) or the like. The fluorescence can be observed at high signal-to-noise ratio (S/N). Since the fluorescence is less susceptible to scattering or absorption in the fluorescent plate, a fluorescent image is free from blurring and has high resolution so as to be measured by a camera with a high degree of accuracy. It is easy to reduce the intensity of the generated fluorescence to $\frac{1}{100}$ or less of the intensity of incident laser light by adjusting (reducing) the concentration (absorption characteristic) and thickness of the fluorescent plate material and fluorescent body. That is, the fluorescent plate also functions as a kind of neutral density filter such that after the separation of the fluorescence by the wavelength separation mirror, the laser light can be observed using the image sensor without entailing signal saturation or signal failure. Further, the amount of heat generated in the fluorescent plate at this time can be reduced so that temperature rise can be suppressed if high-power laser is directly applied. Thus, the measurement can be stably made for a long time. Unlike the laser light or the scattered light thereof, the fluorescence is incoherent light producing less speckles. When used with an optical system having a small numerical aperture (NA), the fluorescence can be accurately focused into an image on the image sensor, resulting in a high degree of freedom in choice of optical system. Further, the fluorescence provides free setting of image magnification based on the combination of lenses, having the advantage of enabling high accuracy measurement of fine beam profile through magnification.

CITATION LIST

Patent Literature

Patent Literature 1: Japanese Patent Application Laid-Open No. 1994-221917
Patent Literature 2: Japanese Patent Application Laid-Open No. 2004-245778
Patent Literature 3: Japanese Patent Application Laid-Open No. 2008-519263

Non-Patent Literature

Non-Patent Literature 1: Masaki Tsunekane et. al. "Proposal for New Measurement Method of High-accuracy 2D Beam Profile" Jan. 11 to 12, 2015, the 35th Annual Conference of Laser Society

SUMMARY OF INVENTION

Technical Problem

The above Patent Literatures and Non-Patent Literature do not make a specific description on the formation of a film formed on a surface of the fluorescent material, fluorescent body or fluorescent plate (hereinafter, collectively referred to as "fluorescent plate") and serving to control the reflection of light at the wavelength of the fluorescence generated in the fluorescent plate. When the laser light is applied onto the fluorescent plate and absorbed therein, the fluorescence generated in the fluorescent plate is generally emitted in all directions. Hence, the fluorescence other than that becoming incident on a camera or image sensor for beam profile measurement is scattered about and lost. Out of the scattered fluorescence, some fluorescence goes out of the device through the surface of the fluorescent plate. Subsequently, the fluorescence in question is often reflected by a surface of an external optical part or of a casing surface before entering the device again through the surface of the fluorescent plate and further entering the above-described beam profile measurement camera or image sensor. The re-entrance of such scattered fluorescence involves the following problem. The fluorescence in question is overlapped with light which is generated in the fluorescent plate and is intrinsically a measurement object, resulting in defamation of the beam profile shape, observation of an actually non-existing image (ghost image), or the decrease in measurement S/N ratio due to the rise of background level. As for the fluorescence generated from the fluorescent plate and scattered in the device but not out of the device, a measure to prevent the fluorescence in question from coming to be mixed in with the fluorescence incident on the camera or image sensor can be taken. For example, the configuration of wall surface in the device is so devised as to prevent the scattered light in the device from being reflected from the wall. However, it is difficult to distinguish or separate the fluorescence reflected back from the outside of the device through the fluorescent plate from the fluorescence which is intrinsically the measurement object. This leads to fear that measurement accuracy and reproducibility as well as the reliability of measurement result are seriously deteriorated.

The configurations set forth in the Patent Literature 3 and the Non-Patent Literature 1 have the following problem. In a case where a laser light having a wavelength close to the wavelength of the fluorescence enters, an optical element for separation between the laser light and the fluorescence fails to accomplish complete separation between the laser light and the fluorescence so that the high-power laser light may follow the same optical path as that of the fluorescence, penetrating into a bandpass filter, camera or image sensor and causing damage or fire damage thereto.

Accordingly, the present invention is directed to the solution to the problems of the conventional configurations and an object thereof is to provide high accuracy measurement of the beam profile of high-power laser by preventing the fluorescence generated in the fluorescent plate from scattering to the outside of the device and preventing the scattered fluorescence from re-entering the fluorescent plate. It is another object of the invention to ensure that in a case where the laser light at any wavelength enters, the bandpass filter, camera or image sensor is prevented from sustaining damage or fire damage.

Solution to Problem

The invention has the following configuration in order to solve a first one of the above-described problems. According to an aspect of the invention, a laser beam profile measurement device for measurement of a two-dimensional profile of laser light, includes: a plate-like or block-like fluorescence generation element including an incidence surface on which the laser light is incident, and an emission surface from which the laser light is emitted; a light separation element for separating fluorescence from the laser light, the fluorescence generated in the fluorescence generation element and emitted from the emission surface; and an image element for receiving the fluorescence, and has a configuration wherein the plate-like or block-like fluorescence generation element includes a first film formed on the incidence surface thereof, and the first film has a wavelength-to-reflectance characteristic of transmitting a wavelength $\lambda 1$ of the laser light and reflecting a wavelength $\lambda 2$ of the fluorescence.

According to a preferred aspect of the invention, the first film may have a reflectance of 70% or more at the wavelength $\lambda 2$ of the fluorescence.

According to another preferred aspect of the invention, the first film may have a reflectance of 90% or more at the wavelength $\lambda 2$ of the fluorescence.

According to another preferred aspect of the invention, the light separation element may include a second film, and the second film may have a wavelength-to-reflectance characteristic of transmitting the wavelength $\lambda 2$ of the fluorescence and reflecting the wavelength $\lambda 1$ of the laser light.

According to another preferred aspect of the invention, the first film may further have a wavelength-to-reflectance characteristic of reflecting a wavelength $\lambda 0$ between the wavelength $\lambda 1$ of the laser light and the wavelength $\lambda 2$ of the fluorescence, while the second film may further have a wavelength-to-reflectance characteristic of reflecting the wavelength $\lambda 0$.

According to another preferred aspect of the invention, the light separation element may include a third film, and the third film has a wavelength-to-reflectance characteristic of reflecting the wavelength λ2 of the fluorescence and transmitting the wavelength λ1 of the laser light.

According to another preferred aspect of the invention, the first film may further have a wavelength-to-reflectance characteristic of reflecting a wavelength λ0 between the wavelength λ1 of the laser light and the wavelength λ2 of the fluorescence, while the third film may further have a wavelength-to-reflectance characteristic of transmitting the wavelength λ0.

An outline of an exemplary configuration and functions of abeam profile measurement device according to the invention will hereinbelow be described with reference to FIG. 1 to FIG. 7. FIG. 1 is a diagram showing an exemplary configuration of a laser-light reflection separation beam profiler employing, as a light separation element, a 45° prism which reflects the laser light and transmits the fluorescence. FIG. 2 is a diagram showing an exemplary configuration of a laser-light transmission separation beam profiler which employs, as the light separation element, a 45° mirror which transmits the laser light and reflects the fluorescence, in place of the 45° prism. FIG. 3 is a block diagram schematically showing functions of a first film S1, a second film S2 and a third film S3 according to the invention. FIG. 4(A) and FIG. 4(B) are graphs showing exemplary wavelength-to-reflectance characteristics of the first film S1 and the second film S2 which are suited to the laser-light reflection separation beam profiler. FIG. 5(A) and FIG. 5(B) are graphs showing exemplary wavelength-to-reflectance characteristics of the first film S1 and the third film S3 which are suited to the laser-light reflection separation beam profiler. FIG. 6(A) and FIG. 6(B) are graphs showing exemplary wavelength-to-reflectance characteristic of the first film S1 and the second film S2 which are more suited to the laser-light reflection separation beam profiler. FIG. 7(A) and FIG. 7(B) are graphs showing exemplary wavelength-to-reflectance characteristic of the first film S1 and the third film S3 which are more suited to the laser-light reflection separation beam profiler.

According to an example of the laser-light reflection separation beam profiler shown in FIG. 1, a fluorescence generation element 10 includes a fluorescent plate 1 which, at the incidence of a laser light of a wavelength λ1, absorbs a part of the incident light and generates therein fluorescence of a wavelength λ2. Also, according to an example of the laser-light transmission separation beam profiler shown in FIG. 2, a fluorescence generation element 30 includes a fluorescent plate 21 which, at the incidence of the laser light of the wavelength λ1, absorbs a part of the incident light and generates therein the fluorescence of the wavelength λ2. An incidence surface 1a of the fluorescent plate 1 and an incidence surface 21a of the fluorescent plate 21 are each formed with a first film S1 which has a wavelength-to-reflectance characteristic of transmitting the wavelength λ1 of the laser light and reflecting the wavelength λ2 of the fluorescence. This first film S1 has a wavelength-to-reflectance characteristic as shown in any of FIG. 4(A) to FIG. 7(A). Herein, the phrase "the film has a wavelength-to-reflectance characteristic of transmitting the wavelength of the laser light and reflecting the wavelength of the fluorescence" means that in terms of the wavelength-to-reflectance characteristic, the film has low reflectance at the wavelength of the laser light and high reflectance at the wavelength of the fluorescence. In other words, the film has high transmittance at the wavelength of the laser light and low transmittance at the wavelength of the fluorescence. Conversely, the phrase "the film has a wavelength-to-reflectance characteristic of reflecting the wavelength of the laser light and transmitting the wavelength of the fluorescence" means that in terms of the wavelength-to-reflectance characteristic, the film has high reflectance at the wavelength of the laser light and low reflectance at the wavelength of the fluorescence. In other words, the film has low transmittance at the wavelength of the laser light and high transmittance at the wavelength of the fluorescence. The reflectance of a film is defined as a ratio of a quantity of light reflected by the film to a quantity of light incident on the film. In the following description referring to the wavelength-to-reflectance characteristic shown in FIG. 4 to FIG. 7, reflectance of 70% or 90% corresponds to high reflectance while a reflectance of nearly 0% corresponds to low reflectance. However, these numerical values of the reflectance are literally cited as examples and the invention is not limited to these values.

In each of FIG. 1 or FIG. 2, the laser light of the wavelength λ1 penetrates through the first film S1 formed on the incidence surface 1a, 21a of the fluorescent plate 1, 21 so as to enter the fluorescent plate 1, 21. Apart of the fluorescence of the wavelength λ2 generated in the fluorescent plate 1, 21 goes toward the incidence surface 1a, 21a but most of it is returned toward an emission surface 1b, 21b as reflected by the first film S1 formed on the incidence surface 1a, 21a. Namely, the first film S1 prevents apart of the fluorescence generated in the fluorescent plate 1, 21 from penetrating through the incidence surface 1a, 21a to be scattered and lost in the outside of the device. In addition, if apart of the fluorescence toward the incidence surface 1a, 21a penetrates through the first film S1 so as to be scattered from the incidence surface 1a, 21a to be lost in the outside of the device, and the scattered fluorescence is reflected back toward the incidence surface 1a, 21a from the outside of the device, most of the reflected fluorescence is similarly reflected by the first film S1 to the outside of the device. That is, the first film S1 also prevents a part of the fluorescence scattered to the outside of the device from becoming incident again on the fluorescent plate 1, 21 through the incidence surface 1a, 21a. This is effective to limit or prevent adverse effects on the beam profile measurement which are caused by the fluorescence scattered to the outside of the device and becoming incident again on the fluorescent plate. Further, the fluorescence generated in the fluorescent plate does not go outside the device through the incidence surface but is reflected by the first film S1 to the inside of the device. This leads to an advantage that the fluorescence generated in the fluorescent plate is increased in the quantity of light to be observed as image by the image sensor so that the device is improved in S/N performance.

In a case where the first film S1 has a reflectance of 70% at the wavelength λ2 of fluorescence (e.g., reflectance property of the first film S1 shown in FIG. 4(A), FIG. 5(A), FIG. 6(A), FIG. 7(A)), for example), the light quantity of fluorescence scattered from the fluorescent plate 1, 21 to the outside of the device is 30% of the light quantity when the first film S1 has low reflectance (e.g., a reflectance of nearly 0%). Further, when a part of the fluorescence scattered to the outside of the device is reflected back from the outside to the fluorescent plate 1, 21 again, 70% of the returned fluorescence is reflected to the outside again by the surface of the fluorescent plate 1, 21. Hence, the quantity of light entering the fluorescent plate 1, 21 is reduced to 9% as compared with the case where the first film S1 has the low reflectance. Thus, the adverse effect on the beam profile measurement caused by the fluorescence scattered to the outside but becoming incident again on the fluorescent plate can be reduced notably.

In a case where the first film S1 has a reflectance of 90% at the wavelength $\lambda 2$ of fluorescence (illustrated by the example of FIG. 8(A)), the quantity of light becoming incident again on the fluorescent plate 1, 21 from the outside of the device is reduced to 1% as compared with the case where the first film S1 has the low reflectance (e.g., a reflectance of nearly 0%). Thus, the adverse effect on the beam profile measurement caused by the fluorescence scattered to the outside of the device but becoming incident again on the fluorescent plate can be reduced even further. What is more, the fluorescence generated in the fluorescent plate does not go out of the device from the incidence surface but is reflected by the first film S1 into the device. This also leads to an advantage that the fluorescence generated in the fluorescent plate is increased in the quantity of light to be observed as image by the image sensor so that the device is improved in S/N performance.

Now, let us look at a case where a second laser light having a wavelength significantly different from the wavelength $\lambda 1$ of the laser light or particularly a wavelength $\lambda 2'$ close to the wavelength $\lambda 2$ of the fluorescence is incident on the florescence generation element. In the example of the laser-light reflection separation beam profile measurement device shown in FIG. 1, a reflection surface $3b$ in a 45° prism 3 as a light separation element is formed with the second film S2 having a wavelength-to-reflectance characteristic of transmitting the wavelength $\lambda 2$ of the fluorescence and reflecting the wavelength $\lambda 1$ of the laser light. Similarly in the example of the laser-light transmission separation beam profile measurement device shown in FIG. 2, a reflection surface $23a$ of a 45° mirror 23 as the light separation element is formed with the third film S3 having a wavelength-to-reflectance characteristic of reflecting the wavelength $\lambda 2$ of the fluorescence and transmitting the wavelength $\lambda 1$ of the laser light. These second film S2 and third film S3 on the light separation element respectively emit the laser light through the fluorescence generation element to the outside of the device by reflection and transmission and respectively guide the fluorescence to the image sensor by transmission and reflection.

In an example, the second film S2 may have a reflectance nearly 100% at the wavelength $\lambda 1$ of the laser light and a reflectance nearly 0% at the wavelength $\lambda 2$ of the fluorescence (the wavelength-to-reflectance characteristic of the second film S2 shown in FIG. 4(B), FIG. 6(B)). Similarly, the third film S3 may have a reflectance nearly 0% at the wavelength $\lambda 1$ of the laser light and a reflectance nearly 100% at the wavelength $\lambda 2$ of the fluorescence (the wavelength-to-reflectance characteristic of the third film S2 shown in FIG. 5(B), FIG. 7(B)).

In the example of the laser-light reflection separation beam profiler shown in FIG. 1, let us focus attention on the wavelength-to-reflectance characteristics of the first film S1 and the second film S2 at a wavelength $\lambda 0$ between the wavelength $\lambda 1$ of the laser light and the wavelength $\lambda 2$ of the fluorescence. In an example of a common wavelength-to-reflectance characteristic shown in FIG. 4, the first film S1 has a reflectance nearly 0% at the wavelength $\lambda 0$ just as at the wavelength $\lambda 1$ (in FIG. 4(A)), while the second film S2 has a reflectance nearly 0% at the wavelength $\lambda 0$ just as at the wavelength $\lambda 2$ (in FIG. 4(B)). In this example, if the wavelength $\lambda 2'$ of the incident second laser light is the same as or close to the wavelength $\lambda 2$ of the fluorescence, 70% of the incoming second laser light is reflected by the first film S1 to the outside of the device while the remaining 30% of the light penetrates into the fluorescence generation element. Having the wavelength which is the same as or close to that of the fluorescence, the second laser light subsequently penetrates through the second film S2 formed on the reflection surface of the light separation element, too and goes toward the image sensor. The second laser light, 70% of which is already reflected by the first film S1, is dimmed. Hence, a likelihood that the second laser light may cause damage or fire damage to the bandpass filter, camera or image sensor can be notably reduced. That is, if the first film S1 having such a wavelength-to-reflectance characteristic as to transmit the wavelength $\lambda 1$ of the laser light as the measurement object and to reflect the wavelength $\lambda 2$ of the fluorescence is formed on the incidence surface $1a$ of the fluorescence generation element, the damage on the optical system or the image element of the device can be reduced even when the second laser light having the wavelength which is the same as or close to the wavelength $\lambda 2$ of the fluorescence enters the device.

However, if the wavelength $\lambda 2'$ of the incident second laser light is the same as or close to the wavelength $\lambda 0$, almost all of the second laser light goes toward the image sensor, as penetrating through the first film S1 and the fluorescence generation element 10, and also through the second film S2 formed on the reflection surface $3b$ of the light separation element. This leads to the fear that the intensive second laser light penetrates into the bandpass filter, camera or image sensor, causing damage or fire damage to these elements. In a case where the first film S1 and the second film S2 have the wavelength-to-reflectance characteristics shown in FIG. 4, therefore, it is necessary to confirm that the wavelength of the incident laser light is not the same as nor close to the wavelength $\lambda 0$. Otherwise, it is necessary to make sure that the laser light of the wavelength in question is not allowed to enter the device.

Similarly, in an example of a laser-light transmission separation beam profiler shown in FIG. 2, an example of common wavelength-to-reflectance characteristics shown in FIG. 5 are as follows. The first film S1 has a reflectance close to 0% at the wavelength $\lambda 0$ just as a reflectance at the wavelength $\lambda 1$ (FIG. 5(A)) while the third film S3 has a reflectance close to 100% at the wavelength $\lambda 0$ just as a reflectance at the wavelength $\lambda 1$ (FIG. 5(B)). If, in this example, the wavelength $\lambda 2'$ of the incident second laser light is the same as or close to the wavelength $\lambda 2$ of the fluorescence, 70% of the incoming second laser light is reflected by the first film S1 to the outside of the device and hence, the damage to the device can be reduced just as with the above-described laser-light reflection separation beam profiler. However, if the wavelength $\lambda 2'$ of the incident second laser light is the same as or close to this wavelength $\lambda 0$, almost all of the laser light penetrates through the first film S1 formed on the incidence surface of the fluorescence generation element 30 and then through the fluorescence generation element 30. Subsequently, all the transmitted laser light is reflected by the third film S3 formed on the reflection surface $23a$ of a light separation element 23, thus going toward the image sensor. It is therefore likely that the intensive second laser light penetrates into the bandpass filter, camera or image sensor, causing damage or fire damage to these elements. In a case where the first film S1 and the third film S3 have the wavelength-to-reflectance characteristics shown in FIG. 5, therefore, it is necessary to confirm that the wavelength of the incident laser light is not the same as nor close to the wavelength $\lambda 0$ in question. Otherwise, it is necessary to make sure that the laser light of the wavelength in question is not allowed to enter the device. It is therefore desired that there is provided a device which can prevent the bandpass filter, camera or image sensor from suffering the damage or fire damage when a laser light of any wavelength enters therein.

In the example of the laser-light reflection separation beam profiler shown in FIG. 1, it is more preferred that the first film S1 has a high reflectance at the wavelength $\lambda 0$ between the wavelength $\lambda 1$ of the laser light and the wavelength $\lambda 2$ of the fluorescence and that the second film S2 also has a high reflectance at the wavelength $\lambda 0$. As a specific example, FIG. 6(A) shows a wavelength-to-reflectance characteristic of the first film S1 while FIG. 6(B) shows a wavelength-to-reflectance characteristic of the second film S2. It is noted here that the first film S1 has a reflectance of 70% at the wavelength $\lambda 0$ which is equal to the reflectance at the wavelength $\lambda 2$ of the fluorescence. The second film S2 has a reflectance of almost 100% at the wavelength $\lambda 0$ which is equal to the reflectance at the wavelength $\lambda 1$ of the laser light. In a case where the first film S1 and the second film S2 have such wavelength-to-reflectance characteristics, how the light path of the laser light varies depending upon the wavelength of the second laser light entering the device is described in sequence. First, when a laser light of a wavelength $\lambda 1$ or less enters, the laser light does not go toward the image sensor because after penetrating through the first film S1, all the laser light is reflected by the second film S2 to the outside of the device. When a laser light of a wavelength more than $\lambda 1$ and equal to or less than $\lambda 0$ enters, all the laser light of a wavelength close to $\lambda 1$ penetrates through the first film S1 while 70% of the light of a wavelength close to $\lambda 0$ is reflected by the first film S1 to the outside of the device. On the other hand, the remaining 30% of the light penetrates through the first film S1. However, the laser light does not go toward the image sensor because all the laser light of the either wavelength is reflected by the second film S2 to the outside of the device. When the laser light of wavelength above $\lambda 0$ enters, the first film S1 reflects 70% of the incident light irrespective of the wavelength while the remaining 30% of the light goes toward the light separation element. Of these, the light of the wavelength equal to or close to $\lambda 2$ also penetrates through the second film S2 and goes toward the image sensor. However, the laser light, 70% of which is already reflected by the first film S1, is dimmed. Hence, the likelihood that the laser light may cause damage or fire damage to the bandpass filter, camera or image sensor can be notably reduced. In the beam profiler having the configuration shown in FIG. 1, the following feature is obtained by configuring the first film S1 and the second film S2 to have the wavelength-to-reflectance characteristics shown in FIG. 6. If a laser light of any wavelength including the wavelength $\lambda 2$ of the fluorescence enters, most of the incident light is emitted to the outside of the device by the first film S1 or the second film S2. Thus, the quantity of the laser light reaching the camera or image sensor is properly limited irrespective of the wavelength of the incident laser light. Accordingly, the reliability of the device can be enhanced. The wavelength-to-reflectance characteristic of the first film S1 shown in FIG. 6 is defined such that the film exhibits a reflectance of 70% at the wavelength $\lambda 0$ and the wavelength $\lambda 2$. If the first film has a higher reflectance of 90% or almost 100% as exemplified by the embodiments to be described hereinlater, the film can reduce the quantity of the laser light reaching the image sensor substantially to 0% no matter what wavelength has the second laser light. Thus, the bandpass filter, the camera or the image sensor can be completely prevented from suffering the damage or fire damage.

Similarly in the example of the laser-light transmission separation beam profiler shown in FIG. 2, it is more preferred that at a wavelength $\lambda 0$ between the wavelength $\lambda 1$ of the laser light and the wavelength $\lambda 2$ of the fluorescence, the first film S1 may have a high reflectance at the wavelength $\lambda 0$ while the third film S3 may have a low reflectance at the wavelength $\lambda 0$. The wavelength-to-reflectance characteristics of the first film S1 and the third film S3 are shown in FIG. 7, as a specific example. It is noted here that the first film S1 has a reflectance of 70% at the wavelength $\lambda 0$, which is the same as the reflectance at the wavelength $\lambda 2$ of the fluorescence. The third film S3 has a reflectance of nearly 0% at the wavelength $\lambda 0$, which is the same as the reflectance at the wavelength $\lambda 1$ of the laser light. In a case where the first film S1 and the third film S3 have such wavelength-to-reflectance characteristics, how the light path of the laser light varies depending upon the wavelength of the second laser light entering the device is described in sequence. First, when the laser light of the wavelength $\lambda 1$ or less enters, the laser light does not go toward the image sensor because after penetrating through the first film S1, all the laser light also penetrates through the third film S3 to be emitted to the outside of the device. When the laser light of the wavelength more than $\lambda 1$ and equal to or less than $\lambda 0$ enters, all the laser light of the wavelength close to $\lambda 1$ penetrates through the first film S1 while 70% of the light of the wavelength close to $\lambda 0$ is reflected by the first film S1 to the outside of the device. On the other hand, the remaining 30% of the light penetrates through the first film S1. However, the laser light does not go toward the image sensor because all the laser light of the either wavelength penetrates through the third film S3 to be emitted to the outside of the device. When the laser light of wavelength above $\lambda 0$ enters, the first film S1 reflects 70% of the light irrespective of the wavelength while the remaining 30% of the light goes toward the light separation element. Of these, the light of the wavelength equal to or close to $\lambda 2$ is reflected by the third film S3 and goes toward the image sensor. However, the light, 70% of which is already reflected by the first film S1, is dimmed. Hence, the likelihood that the laser light may cause the damage or fire damage to the bandpass filter, camera or image sensor can be notably reduced. In the beam profiler having the configuration shown in FIG. 2, the following feature is obtained by configuring the first film S1 and the third film S3 to have the wavelength-to-reflectance characteristics shown in FIG. 7. If a laser light of any wavelength enters, most of the incident light is emitted to the outside of the device by the first film S1 or the third film S3. Thus, the quantity of the laser light reaching the camera or image sensor is properly limited irrespective of the wavelength of the incident laser light. Hence, the reliability of the device can be enhanced. The wavelength-to-reflectance characteristic of the first film S1 shown in FIG. 7 is defined such that the film has the reflectance of 70% at the wavelength $\lambda 0$ and the wavelength $\lambda 2$. If the film has a higher reflectance of 90% or almost 100% as exemplified by the embodiments to be described hereinlater, the film can reduce the quantity of the second laser light reaching the image sensor to nearly 0% no matter what wavelength has the second laser light. Thus, the bandpass filter, camera or image sensor can be completely prevented from suffering the damage or fire damage. It is assumed that a relation of wavelength $\lambda 1$ of laser light<wavelength $\lambda 0$<wavelength $\lambda 2$ of fluorescence exists in FIG. 4 to FIG. 7 as well as in FIG. 8 and FIG. 9.

FIG. 3 is a block diagram schematically showing functions of the above films. The following feature is obtained by selecting the wavelength-to-reflectance characteristic of the first film S1 of the fluorescence generation element and the wavelength-to-reflectance characteristic of the second film S2 or the third film S3 of the wavelength separation element as illustrated in FIG. 6 or FIG. 7. When a laser light of any wavelength enters the beam profiler, the laser light is emitted to the outside of the device by the first film S1 in combination with the second film S2 or the third film S4 before the laser light reaches the image sensor. In the meantime, only the fluorescence generated in the fluorescent plate becomes incident on the image sensor and is observed. It is assumed here that there is a relation of wavelength $\lambda 1$ of laser light <wavelength $\lambda 0$<wavelength $\lambda 2'$ of second laser light.

It is noted here that an optimum wavelength may be selected as the wavelength $\lambda 0$ according to a central wavelength of the laser light to be principally measured (including the wavelength $\lambda 1$ of the laser light according to the invention), an absorption wavelength region of the fluorescent plate, a fluorescence detection wavelength (including the wavelength $\lambda 2$ of the fluorescence according to the invention), or a fluorescence generation wavelength region. The configurations of the first film S1, the second film S2 and the third film S3 may each be designed according to the selected wavelength $\lambda 0$ and a required reflectance at the selected wavelength $\lambda 0$.

Advantageous Effects of Invention

The inventive beam profile measurement device using the fluorescence is capable of high accuracy measurement of the beam profile of high-power laser by inhibiting the fluorescence generated in the fluorescence generation element from scattering to the outside of the device and by inhibiting the scattered fluorescence from becoming incident again to the fluorescence generation element.

According to the preferred embodiment of the inventive beam profile measurement device using the fluorescence, even when a laser light of any wavelength enters the device from outside, most of the incident light is emitted to the outside of the device by the first film S1 or the second film S2 or the third film S3. This is effective to notably reduce the risk of damage or fire damage to the bandpass filter, camera or image sensor which can be encountered by the conventional configuration when the second laser light of the wavelength close to the wavelength $\lambda 2$ of the fluorescence is made incident on the device. Thus, the device can be improved in reliability.

The above-described objects and advantages as well as other objects and advantages of the invention will be more explicitly understood from the following description of preferred embodiments of the invention. It should be understood that the following embodiments are to be taken as mere examples but the invention is not limited to these.

DESCRIPTION OF EMBODIMENTS

Preferred embodiments of the laser beam profile measurement device according to the invention are specifically described as below based on the accompanying drawings thereof and with reference to plural examples of the laser beam profile measurement device.

Figure 8:
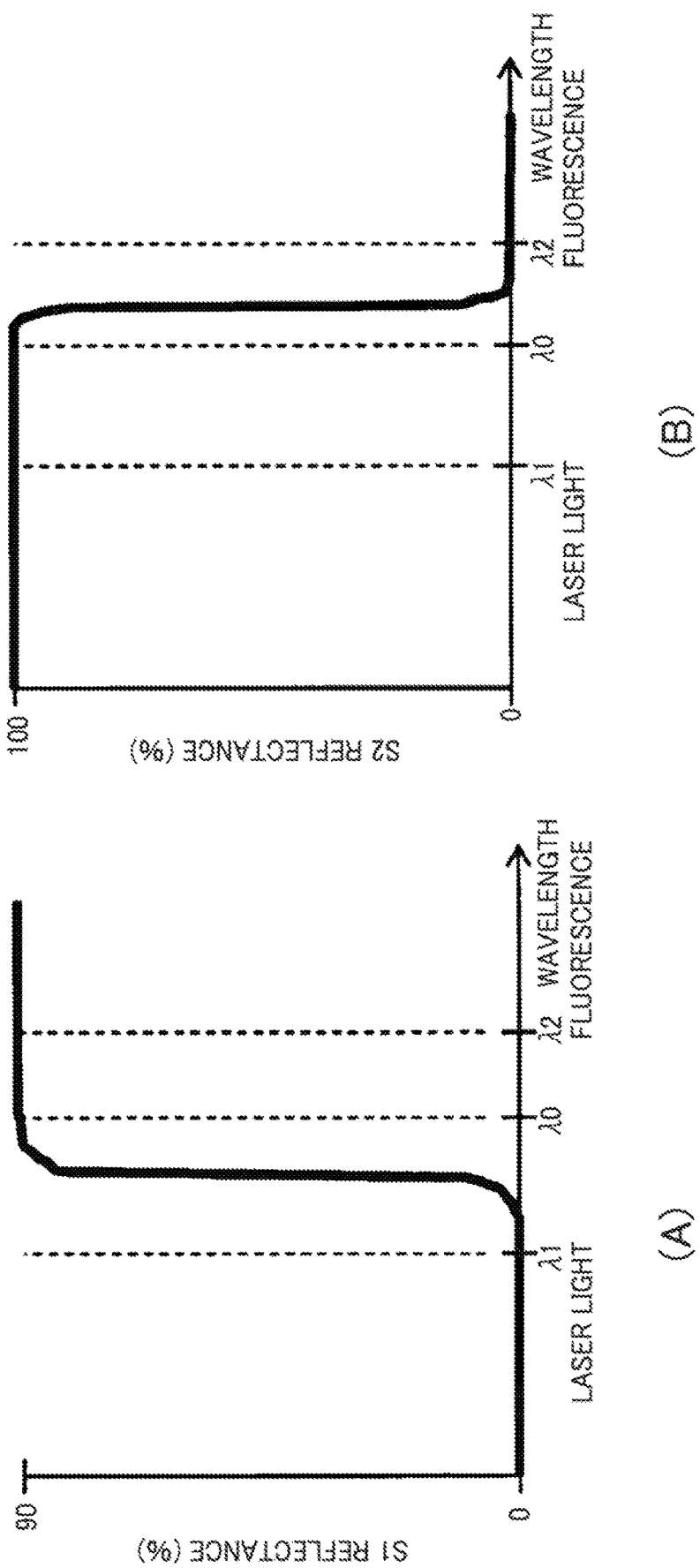
FIGS. 8(a)-8(b) illustrate a set of graphs showing even more preferred exemplary wavelength-to-reflectance characteristics of the first film S1 and the second film S2 of the laser-light reflection separation beam profiler.

Referring again to FIG. 1, an example of the laser beam profile measurement device according to the invention is described. As already mentioned above, FIG. 1 shows an exemplary configuration of a laser-light reflection separation beam profiler 100, particularly showing a positional relation of components of the device as seen from above. A fluorescence generation element 10 of the laser-light reflection separation beam profiler 100 has a cylindrical shape having a diameter of 10 mm and includes a fluorescent plate 1 and a support body 2. The fluorescent plate 1 is made of an Nd:YAG crystalline having Nd concentration of 1.0 at. % and a thickness of 0.2 mm. The support body 2 is made of Nd-free YAG crystalline having a thickness of 2 mm. Opposed surfaces (represented by a reference character 1b in FIG. 1) of the fluorescent plate 1 and the support body 2 are integrally joined together by thermocompression bonding without using a bonding agent. Since these components are made of the same base material YAG, the components do not encounter light reflection at an interface thereof due to different refraction indexes if these components are directly boded to each other. Also having the same thermal expansion rate, these components are less susceptible to failure such as deformation-induced separation of the fluorescent plate 1 from the support body 2 even when the fluorescent plate generates heat. As an example of the solution to the problem according to the invention, a dielectric film S1 is formed on a laser incidence surface 1a of the fluorescent plate 1. The dielectric film has a reflectance of 0.5% in a wavelength range of 800 nm to 900 nm of a laser light 12 principally assumed to be measured and a reflectance of 90% at a 1064 nm wavelength of the fluorescence generated in the fluorescent plate 1 and detected by an image sensor 8. As an example of the solution to the problem according to the invention, the first film S1 has a structure which is so designed as to have a wavelength-to-reflectance characteristic shown in FIG. 8(A) where λ1 is 800 nm, λ0 is 950 nm and λ2 is 1064 nm. On the other hand, formed on an opposite surface 2b of the support body 2 from the surface formed with the fluorescent plate 1 is a dielectric film (not shown) having a reflectance of 0.5% in a wide band from 800 nm to 1100 nm such that the laser light 12 and a fluorescence 13 generated in the fluorescent plate 1 are not reflected. A 45° prism 3 as the light separation element for separation between the laser light 12 and the fluorescence 13 is made of 15 mm-square quartz and is configured by combining two right angle prisms. Formed on an incidence surface 3a of the 45° prism 3 is a dielectric film (not shown) having a reflectance of 0.5% in a range of 800 nm to 1100 nm such that the laser light 12 and the generated fluorescence 13 are not reflected. Formed on a surface 3b inclined at 45° in the 45° prism 3 is a dielectric film having a reflectance of 99.7% to light at an incidence angle of 45° and in a wavelength range from 800 nm to 900 nm and having a reflectance of 3% at the wavelength of 1064 nm such as to transmit the fluorescence at the wavelength of 1064 nm. It is noted here that as an example of the solution to the problem according to the invention, the dielectric film S2 has a structure which is so designed as to have a wavelength-to-reflectance characteristic shown in FIG. 8(B) where λ1 is 808 nm, λ0 is 950 nm and λ2 is 1064 nm. Further, formed on a prism surface 3c from which the fluorescence 13 through the surface 3b is emitted is a dielectric film (not shown) having a reflectance of 0.5% at the wavelength of 1064 nm. Formed on a surface 3d of the 45° prism 3 from which the laser light 12 reflected at 45° by the surface 3b is emitted is a dielectric film (not shown) having a reflectance of 0.5% in a wavelength range from 800 nm to 900 nm.

Figure 1:
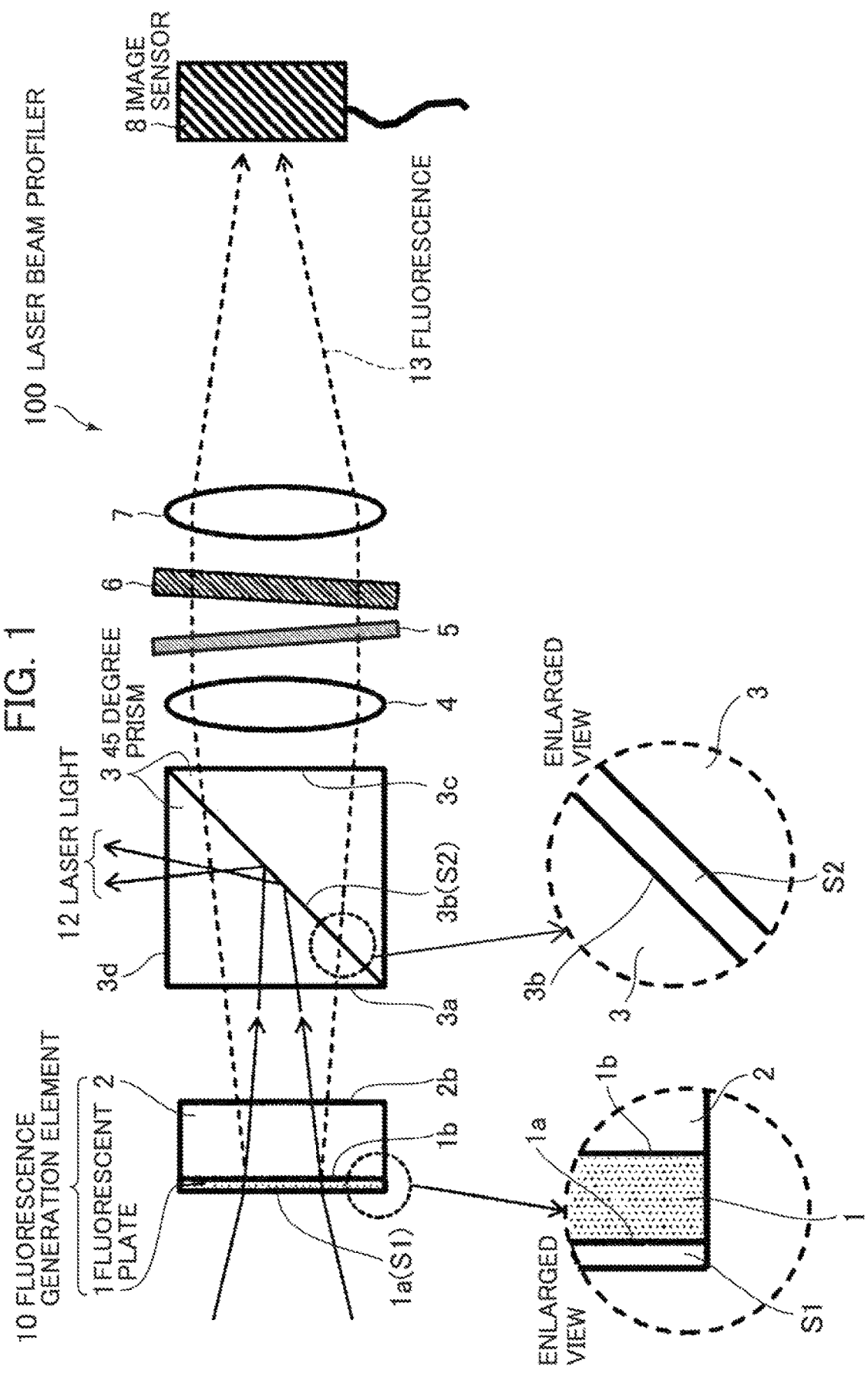
FIG. 1 is a diagram showing an exemplary configuration of a laser-light reflection separation beam profiler of a laser beam profile measurement device according to the invention.

In the laser-light reflection separation beam profiler 100 shown in FIG. 1, the laser light 12 of the wavelength of 808 nm, which is made incident thereon as an example of the laser light to be measured is transmitted through the fluorescent plate 1 and the support body 2 and reflected by the 45° prism 3 to be emitted to the outside of the device. A part of the laser light 12 transmitted through the fluorescent plate 1 is absorbed by the Nd:YAG of the fluorescent plate 1 where the absorbed light is subjected to energy-conversion such as to emit fluorescence around, the fluorescence having a central wavelength of 1 μm proportional to the distribution of laser light intensity. Out of the emitted fluorescence, the 1064 nm fluorescence 13 penetrates through the 45° prism 3 and through an objective lens 4, a neutral density filter 5, a bandpass filter 6 and an imaging lens 7 to reach the CMOS image sensor 8. The objective lens 4 and imaging lens 7 are convex lenses which are made of optical glass known by the generic term "BK7" and which both have a focal length of 50 mm. Formed on the surfaces of these lenses is a dielectric film (not shown) having a reflectance of 0.5% at 1064 nm. The fluorescent plate 1 is located at a focal point of the objective lens 4 while the CMOS image sensor 8 is located at a focal point of the imaging lens 7. In this configuration, a fluorescent image of the fluorescent plate 1 is formed at 1:1 on an acceptance surface (not shown) in the CMOS image sensor 8. The neutral density filter 5 has a transmittance of 10% at the wavelength of 1064 nm and so attenuates the fluorescence as to prevent the saturation of the CMOS image sensor 8. The CMOS image sensor 8 may be adjusted for proper sensitivity to light by removing the neutral density filter 5 if an incident laser light is so weak that fluorescence from the fluorescent plate 1 has low intensity, or by inserting more than one neutral density filter 5 if the laser light and the fluorescence have high intensities. The bandpass filter 6 has such a characteristic as to block light at wavelengths other than 1064 nm in order to prevent the light at wavelengths other than 1064 nm from reaching the CMOS image sensor 8. The bandpass filter 6 has a transmission wavelength interval of 10 nm, for example, at the wavelength of 1064 nm.

Figure 9:
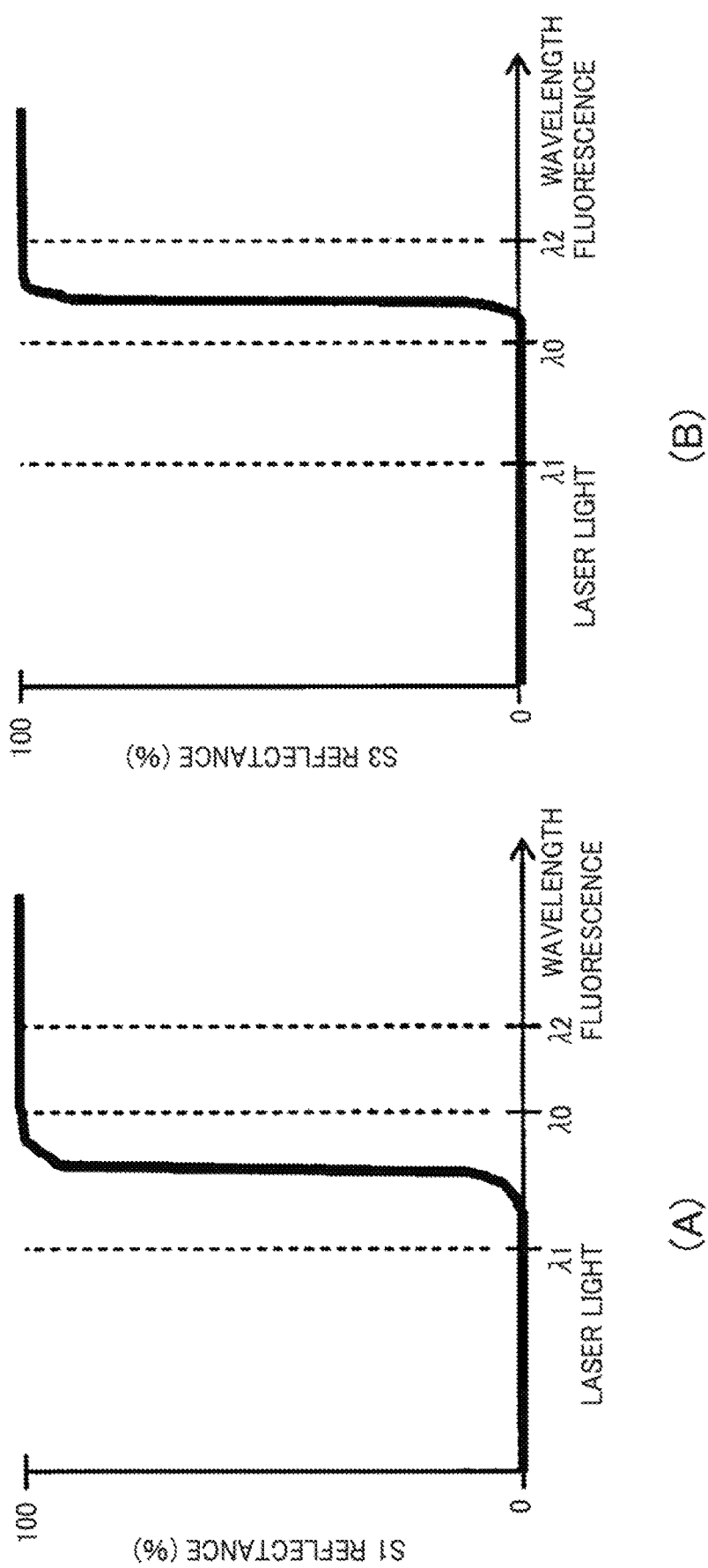
FIGS. 9(a)-9(b) illustrate a set of graphs showing even more preferred exemplary wavelength-to-reflectance characteristics of the first film S1 and the third film S3 of the laser-light transmission separation beam profiler.
Figure 10:
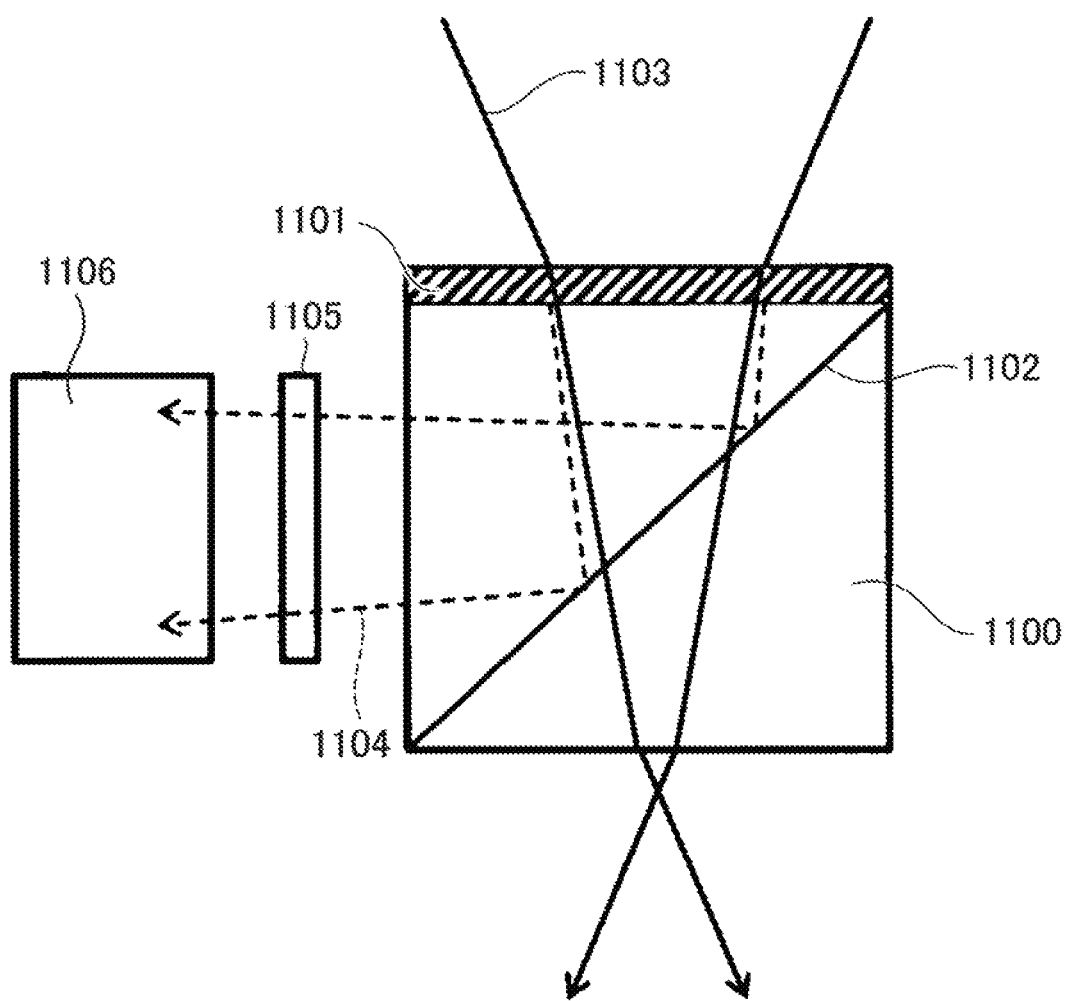
FIG. 10 is a diagram illustrating a conventional example of a beam profile measurement method using fluorescence.

Now referring again to FIG. 2, description is made on another example of the laser beam profile measurement device according to the invention. As already described above, FIG. 2 shows the exemplary configuration of the laser-light transmission separation beam profiler 200, or particularly showing a positional relation of the components of the device as seen from above. A fluorescence generation element 30 of the laser-light transmission separation beam profiler 200 has an incidence surface defined by a 6 mm square prism and is essentially composed of a fluorescent plate 21 and a support body 22. A material of the fluorescent plate 21 is Nd:YAG translucent ceramics having an Nd concentration of 0.7 at. % and a thickness of 0.05 mm. A material of the support body 22 is Nd-free YAG translucent ceramics having a thickness of 2 mm. Opposed surfaces (represented by a reference character 21b in FIG. 2) of the fluorescent plate 21 and the support body 22 are integrally joined together by a low-temperature fusion boding method without using a bonding agent. As an example of the solution to the problem according to the invention, a dielectric film S1 is formed on an incidence surface 21a of the fluorescent plate 21. The dielectric film has a reflectance of 0.5% in a wavelength range of 800 nm to 900 nm of a laser light 32 assumed to be measured and a reflectance of 99% at a 1064 nm wavelength of the fluorescence generated in the fluorescent plate 21 and detected by the image sensor 8. As an example of the solution to the problem according to the invention, the first film S1 has a structure which is so designed as to have a wavelength-to-reflectance characteristic shown in FIG. 9A where λ1 is 800 nm, λ0 is 950 nm and λ2 is 1064 nm. Formed on the opposite surface 22b of the fluorescence generation element 30 from the surface formed with the fluorescent plate 21 is a dielectric film (not shown) having a reflectance of 0.5% in a wide band from 800 nm to 1100 nm such that the laser light 32 and a fluorescence 33 generated in the fluorescent plate 21 are not reflected. Formed on a surface 23a of the 45° mirror 23 is a dielectric film S3 having a reflectance of 99% to light at an incidence angle of 45° and in a wavelength range from 1000 nm to 1100 nm, and a reflectance of 0.3% in a wavelength range from 800 nm to 950 nm. As an example of the solution to the problem according to the invention, the dielectric film S3 has a structure which is so designed as to have a wavelength-to-reflectance characteristic shown in FIG. 9B where λ1 is 800 nm, λ0 is 950 nm, and λ2 is 1064 nm.

Figure 2:
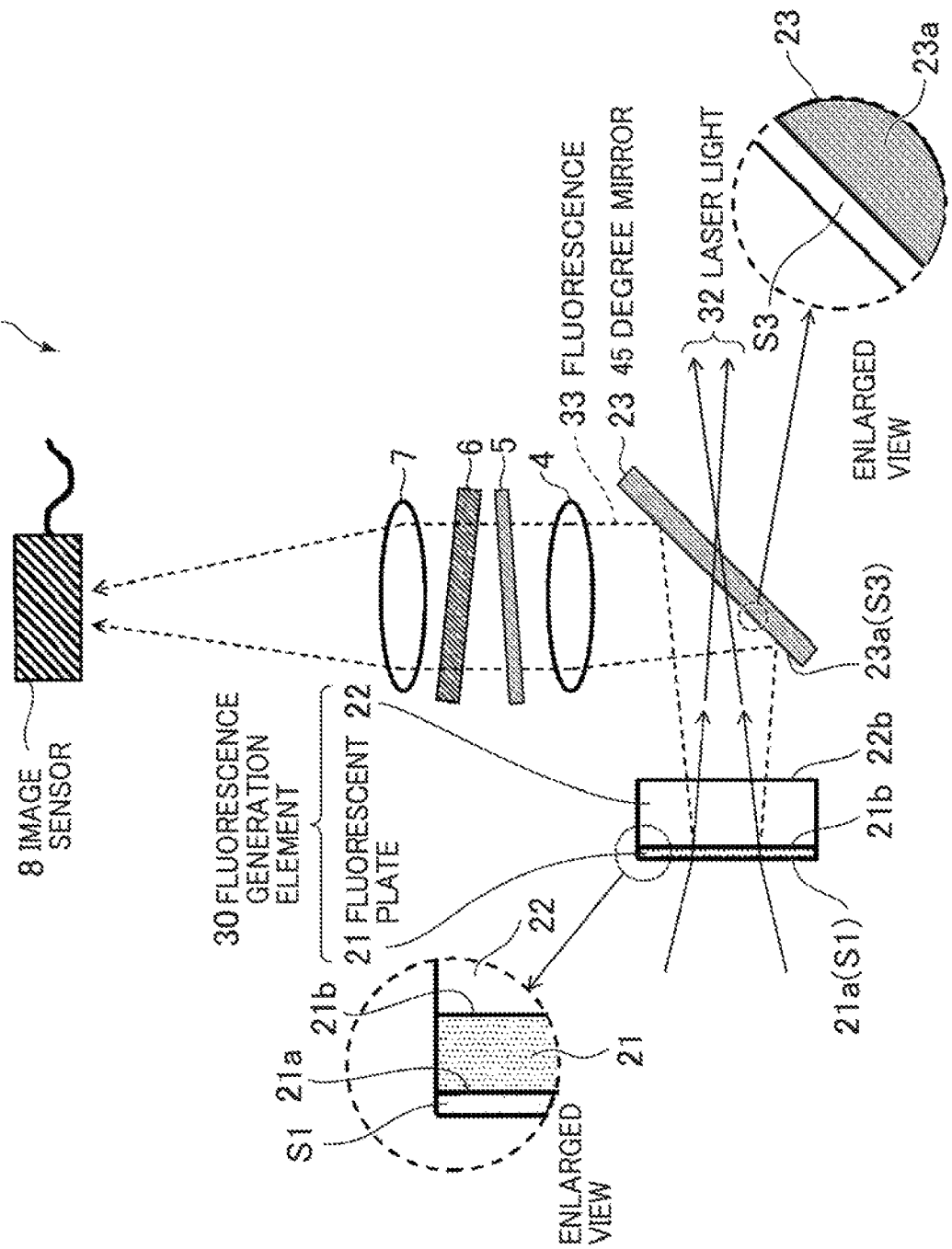
FIG. 2 is a diagram showing an exemplary configuration of a laser-light transmission separation beam profiler of the laser beam profile measurement device according to the invention.
Figure 3:
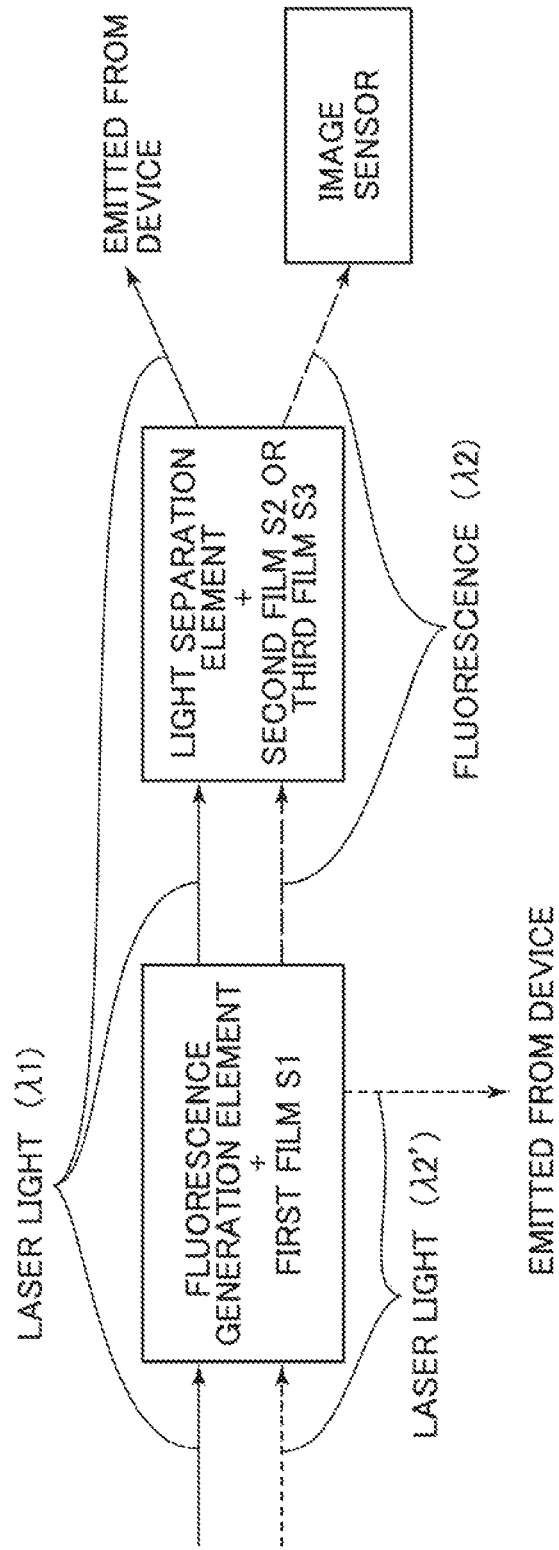
FIG. 3 is a block diagram schematically showing functions of a first film S1 and a second film S2 or a third film S3 according to the invention.
Figure 4:
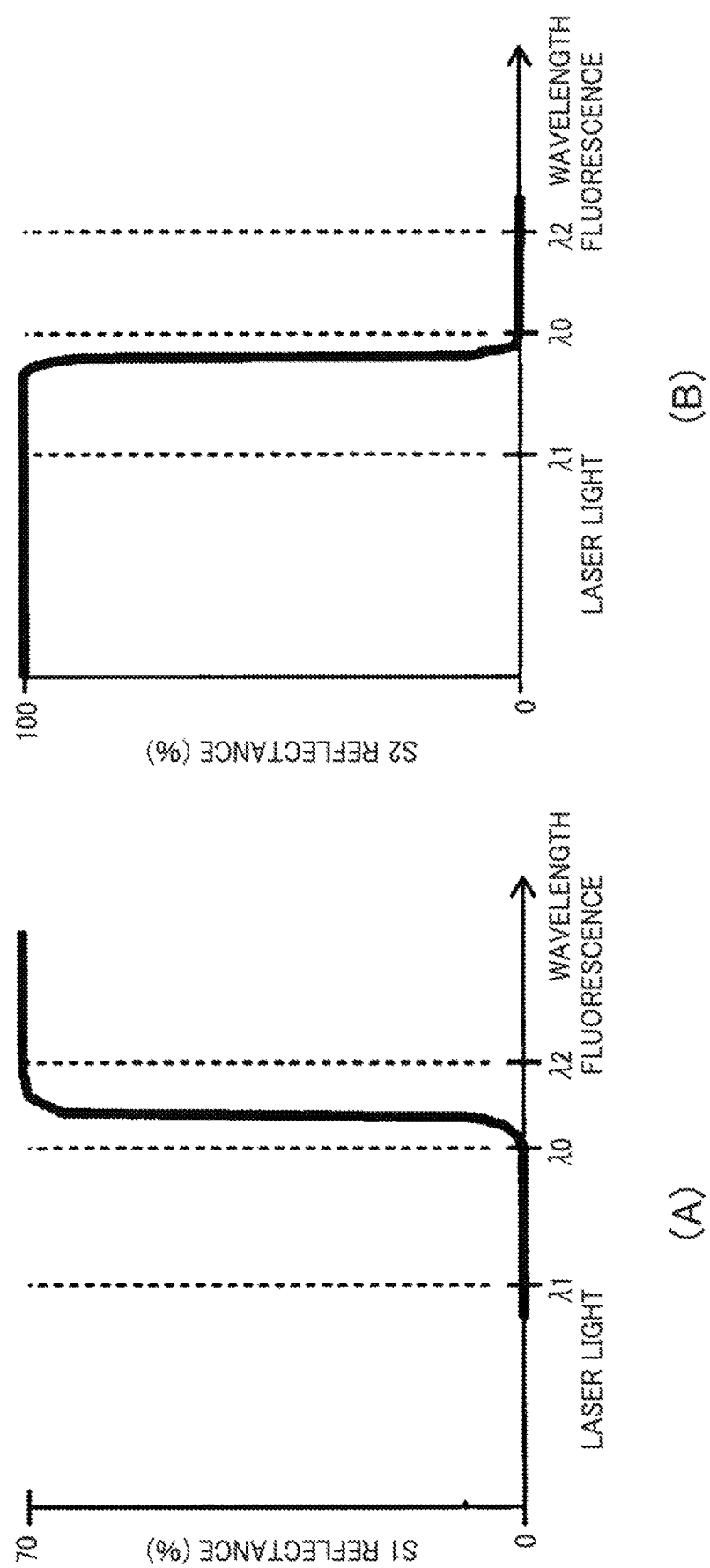
FIGS. 4(a)-4(b) illustrate a set of graphs showing exemplary wavelength-to-reflectance characteristics of the first film S1 and the second film S2 of the laser-light reflection separation beam profiler.
Figure 5:
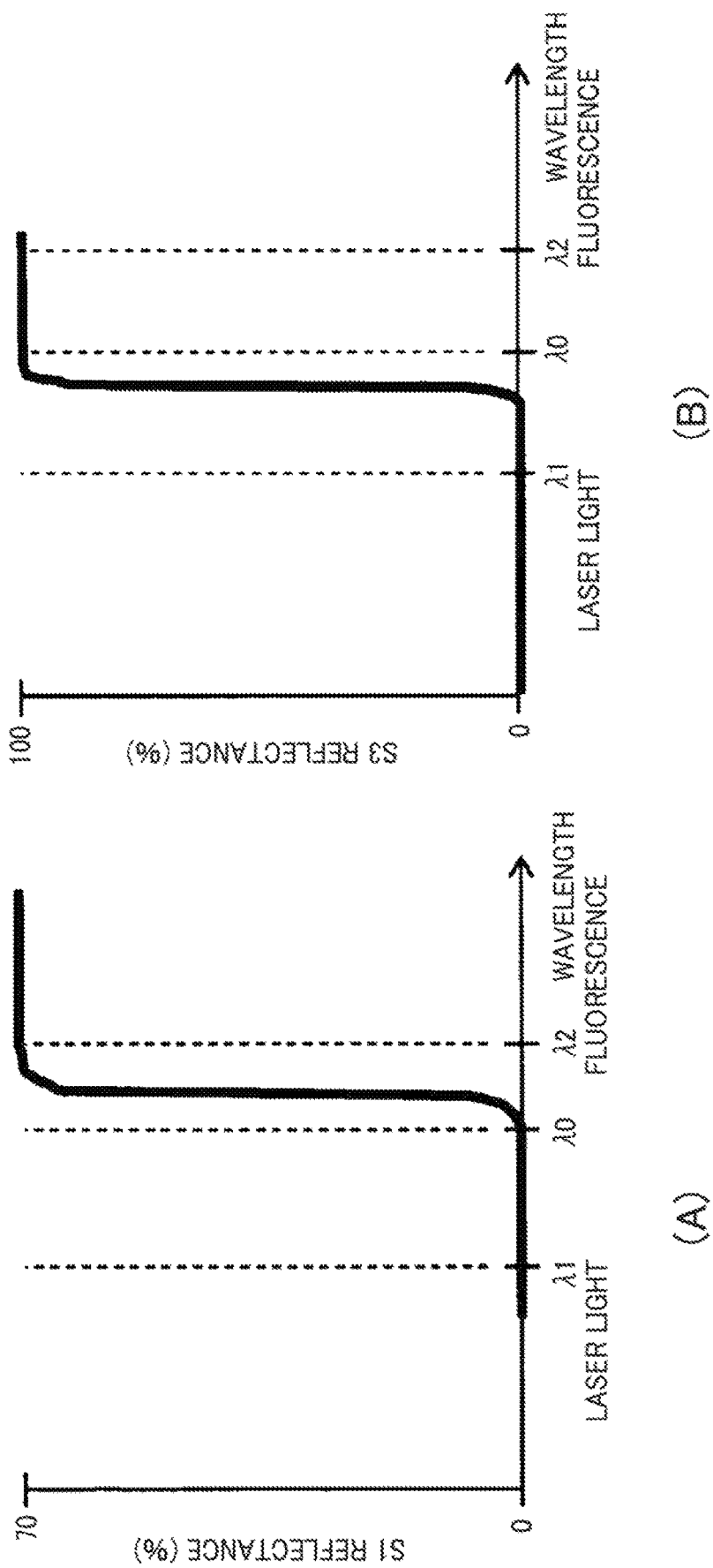
FIGS. 5(a)-5(b) illustrate a set of graphs showing exemplary wavelength-to-reflectance characteristics of the first film S1 and the third film S3 of the laser-light transmission separation beam profiler.
Figure 6:
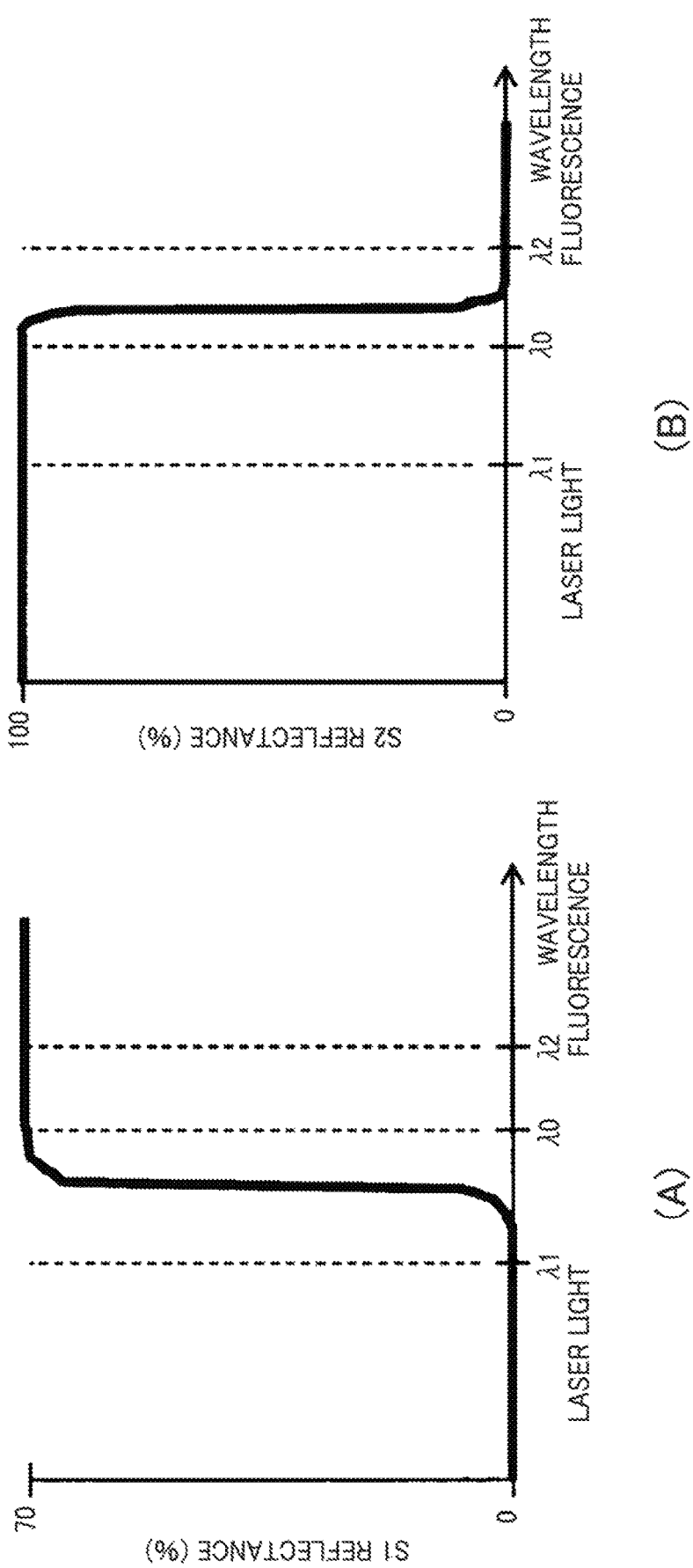
FIGS. 6(a)-6(b) illustrate a set of graphs showing more preferred exemplary wavelength-to-reflectance characteristics of the first film S1 and the second film S2 of the laser-light reflection separation beam profiler.
Figure 7:
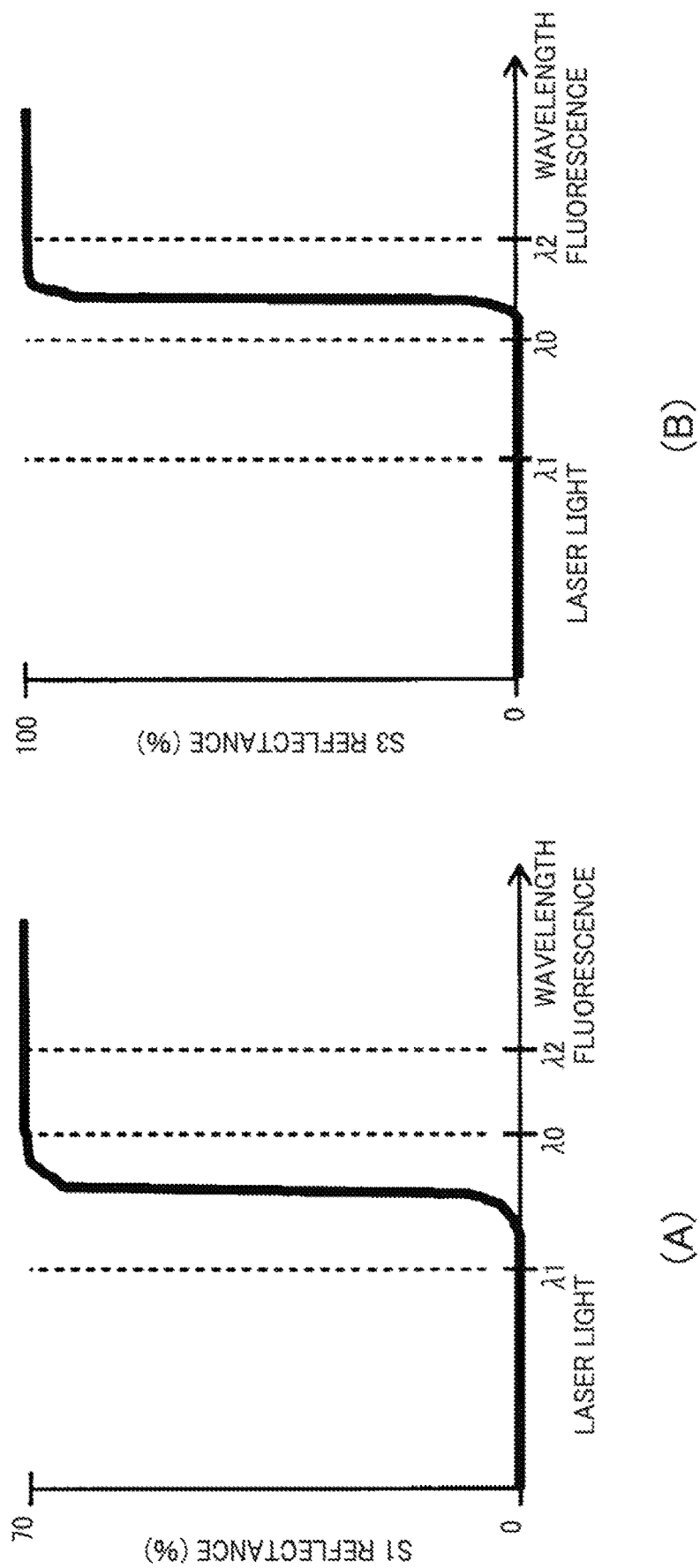
FIGS. 7(a)-7(b) illustrate a set of graphs showing more preferred exemplary wavelength-to-reflectance characteristics of the first film S1 and the third film S3 of the laser-light transmission separation beam profiler.

In the laser-light reflection separation beam profiler 200 shown in FIG. 2, the laser light 32 of 808 nm made incident as an example of the wavelength of the laser light to be measured is transmitted through the fluorescent plate 21 and the support body 22 and further through the 45° mirror 23 so as to be emitted to the outside of the device. When transmitted through the fluorescent plate 21, a part of the laser light is absorbed by the Nd:YAG of the fluorescent plate 21 where the absorbed light is subjected to energy-conversion such as to emit fluorescence around, the fluorescence having a central wavelength of 1 μm proportional to the distribution of laser light intensity. Out of the emitted fluorescence, a fluorescence 33 of 1064 nm is reflected by the 45° mirror 23 and reaches the CMOS image sensor 8 after transmitted through the objective lens 4, the neutral density filter 5, the bandpass filter 6 and the imaging lens 7. The objective lens 4 and imaging lens 7 are convex lenses made of quartz. The objective lens 4 has a focal length of 50 mm while the imaging lens 7 has a focal length of 100 mm. Faulted on the surfaces of these lenses is a dielectric film (not shown) having a reflectance of 0.5% at 1064 nm. The fluorescent plate 21 is located at a focal point of the objective lens 7 while the CMOS image sensor 8 is located at a focal point of the imaging lens 7. A fluorescent image of the fluorescent plate 21 is formed as magnified double-fold and visualized on an acceptance surface (not shown) in the CMOS image sensor 8. The neutral density filter 5 has a transmittance of 10% at the wavelength of 1064 nm and attenuates the fluorescence in order to prevent the saturation of the CMOS image sensor 8. The CMOS image sensor 8 may be adjusted for proper sensitivity to light by removing the neutral density filter 5 if an incident laser light is weak so that fluorescence from the fluorescent plate 21 has low intensity, or by inserting more than one neutral density filter 5 if the laser light and the fluorescence have high intensities. The bandpass filter 6 has such a characteristic as to block light at wavelengths other than 1064 nm in order to prevent the light at wavelengths other than 1064 nm from reaching the CMOS image sensor 8. The bandpass filter 6 has a transmission wavelength interval of 10 nm, for example, at the wavelength of 1064 nm.

In the above examples, $TiO_2$, $Ta_2O_5$, $HfO_2$, $Nb_2O_3$, $ZrO_2$, $MgF_2$, $YF_3$, $SiO_2$, $Al_2O_3$ and the like are preferably used as materials of the dielectric films S1, S2, S3 and the dielectric films formed on the surfaces of the fluorescence generation element, 45° prism, 45° mirror and convex lenses for controlling the reflectance to the wavelength. One or more of these materials for dielectrics may be used for forming a single layered thin film of a specific thickness (such as 0.5 μm or less) or a multi-layered film formed by laminating multiple films of different materials in specific thicknesses on top of each other. This permits a desired reflectance in a particular wavelength range to be imparted to the foiled film. Examples of a method for forming the film include, but not particularly limited to: a vacuum deposition method where a material is heated in vacuo for depositing the material on the surface of an object; a sputter deposition method where a material is bombarded with ions of different material so as to eject the material for deposition on a surface of an object; and the like. What is important is to select an optimum material, an optimum film thickness and an optimum film forming method for obtaining a required reflectance in a required wavelength range.

While the above-described examples cite Nd:YAG as an example of the medium of the fluorescent plate, the scope of the invention is not limited to this in terms of the material of the fluorescent plate. Other usable materials are: Yb:YAG which absorbs lights of 940 nm and 970 nm and emits fluorescence of 1050 nm; Cr,Yb:YAG which includes Yb:YAG and $Cr^{4+}$ ions added thereto for the purpose of shortening fluorescence life-span; Er:YAG which absorbs light near 785 nm or 1.5 μm and emits fluorescence of 1.6 μm or 2.9 μm; Tm:YAG which absorbs light of 780 nm or 785 nm and emits fluorescence of 2.01 μm; Ho:YAG which absorbs light near 1.9 μm and emits fluorescence of 2.01 μm; Cr, Tm, Ho:YAG which absorbs light near 780 nm and emits fluorescence of 2.08 μm; and Ce:YAG which absorbs light near 350 nm or 450 nm and emits fluorescence of 550 nm. Further, Cr, Nd:YAG added with $Cr^{3+}$ ions which absorbs light in visible light region and emits fluorescence of 1 μm is also usable. The above-described light energy absorption wavelengths and fluorescence wavelengths are typical examples and any light energy absorption wavelength or any fluorescence wavelength may be selected from those intrinsic to the medium according to each object or specification. A fluorescence wavelength to be detected need not always be set to a fluorescence peak wavelength of the medium. In order to prevent stray laser light of wavelength close to the fluorescence peak wavelength, a transmission wavelength of a bandpass filter may be set such that the filter detects a fluorescent wavelength by way of a wavelength apart from the fluorescence peak wavelength. While the foregoing examples use YAG as the base material of the fluorescent plate and support body, the invention is not limited to this. Quartz and BK7 that are transparent may be used. Otherwise, $Y_2O_3$, $Lu_2O_3$, LuAG, YAP, $Sc_2O_3$, GGG, GSGG, YSGG, YSO and sapphire, which have higher heat conductivity than YAG, are also usable. The base material may be a single crystal or transparent ceramics. What is required is to select a medium capable of absorbing the wavelength of a laser light to be measured. The fluorescent plate and the support body may be joined together with a transparent bonding agent or otherwise, by means of optical contact where joined surfaces are polished with high accuracies and pressed against each other. From the viewpoint of bonding strength, however, thermal compression bonding for bonding the surfaces together at raised temperatures, diffusion bonding (high-temperature fusion) and low-temperature fusion are more preferred. To prevent the deformation of the fluorescent plate due to heat generation, the fluorescent plate and the support body may preferably be made of equivalent base materials having close expansion coefficients. However, if the fluorescent plate has a small heat value, the support body may be made of a different material from that of the fluorescent plate. For example, the base material of the fluorescent plate may be YAG and that of the support body may be sapphire having good heat conductivity. It is more desirable that the fluorescent plate has a small thickness to enhance measurement position accuracy with respect to the direction of optical axis of the beam. However, if the fluorescent plate is made thin, a transmission distance of the laser light is decreased so that the generated fluorescence is lowered in intensity. Therefore, a desired intensity of fluorescence may be obtained by increasing the additive amount of fluorescent element to the fluorescent plate.

The above description illustrates the example where the objective lens 4 and the imaging lens 7 having the same focal length are used to form the image of the fluorescent plate on the image sensor at a magnification ratio of 1:1 and the example where the imaging lens 7 having a different focal length from that of the objective lens is used to form the image on the image sensor 8 at a magnification ratio of 1:2. However, lenses having focal lengths other than the above may be used to project a magnified image or a minified image on the fluorescent plate onto the image sensor. Imaging optics may use three or more lenses and is not particularly limited. A reflecting mirror may be inserted in the above imaging optics to bend the optical path for the purpose of reducing the overall device size. The insertion positions of the neutral density filter and the bandpass filter are not limited to the above examples. The filters may be inserted anywhere in the imaging optics.

While the above examples illustrate the configuration where the neutral density filter and the bandpass filter are disposed in space between the objective lens and the imaging lens where the light intensity is the lowest. However, the neutral density filter and/or the bandpass filter may also be disposed at places different from the above. More than one neutral density filter or more than one bandpass filter may be employed, as needed. The type or attenuation rate of the neutral density filter, the transmission wavelength, transmission wavelength interval, transmittance and the like of the bandpass filter may be optimally selected on the basis of the laser light to be measured, specifications of the fluorescent plate and the like. The CMOS or CCD image sensor as the image element may employ a material such as Si, Ge, GaAs, InGaAs and InP which have suitable sensitivities at the wavelength of the fluorescence emitted from the fluorescent plate.

INDUSTRIAL APPLICABILITY

The invention is applicable to a wide variety of devices having a function to measure the beam profile of the laser light.

REFERENCE SIGNS LIST 10, 30: fluorescence generation element
1, 21: fluorescent plate
2, 22: support body
1a, 21a: laser-light incidence surface
1b, 21b: interface between fluorescent plate and support body
S1: first film
S2: second film
S3: third film
12, 32: laser light
13, 33: fluorescence
3: 45° prism
4: objective lens
5: neutral density filter
6: bandpass filter
7: imaging lens
8: image sensor
1100: transparent block
1101: fluorescent body
1102: interface
1103: laser light
1105: filter
1106: camera

The invention claimed is:

1. A laser beam profile measurement device for measurement of a two-dimensional profile of laser light, comprising:
a plate-like or block-like fluorescence generation element including an incidence surface on which the laser light is incident, and an emission surface from which the laser light is emitted;
a light separation element for separating fluorescence from the laser light, the fluorescence generated in the fluorescence generation element and emitted from the emission surface; and
an image element for receiving the fluorescence, wherein
the plate-like or block-like fluorescence generation element includes a first film formed on the incidence surface thereof, and the first film has a wavelength-to-reflectance characteristic of transmitting a wavelength $\lambda 1$ of the laser light and reflecting a wavelength $\lambda 2$ of the fluorescence.

2. The laser beam profile measurement device according to claim 1, wherein
the first film has a reflectance of 70% or more at the wavelength $\lambda 2$ of the fluorescence.

3. The laser beam profile measurement device according to claim 1, wherein
the first film has a reflectance of 90% or more at the wavelength $\lambda 2$ of the fluorescence.

4. The laser beam profile measurement device according to claim 1, wherein
the light separation element includes a second film, and the second film has a wavelength-to-reflectance characteristic of transmitting the wavelength $\lambda 2$ of the fluorescence and reflecting the wavelength $\lambda 1$ of the laser light.

5. The laser beam profile measurement device according to claim 4, wherein
the first film further has a wavelength-to-reflectance characteristic of reflecting a wavelength $\lambda 0$ between the wavelength $\lambda 1$ of the laser light and the wavelength $\lambda 2$ of the fluorescence, while the second film further has a wavelength-to-reflectance characteristic of reflecting the wavelength $\lambda 0$.

6. The laser beam profile measurement device according to claim 1, wherein
the light separation element includes a third film, and the third film has a wavelength-to-reflectance characteristic of reflecting the wavelength $\lambda 2$ of the fluorescence and transmitting the wavelength $\lambda 1$ of the laser light.

7. The laser beam profile measurement device according to claim 6, wherein
the first film further has a wavelength-to-reflectance characteristic of reflecting a wavelength $\lambda 0$ between the wavelength $\lambda 1$ of the laser light and the wavelength $\lambda 2$ of the fluorescence, while the third film further has a wavelength-to-reflectance characteristic of transmitting the wavelength $\lambda 0$.

\* \* \* \* \*